US012619445B2

(12) United States Patent
Lin et al.

(10) Patent No.: US 12,619,445 B2
(45) Date of Patent: May 5, 2026

(54) COMMAND LINE SCRIPT AUTOMATION BY MONITORING EXECUTION OF COMPLETED TASKS

(71) Applicant: INTERNATIONAL BUSINESS MACHINES CORPORATION, Armonk, NY (US)

(72) Inventors: Raymund Lin, Taipei (TW); Nan Chen, Beijing (CN); Ju Ling Liu, Beijing (CN); Ye Chuan Wang, Beijing (CN); Li Na Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 18/416,860

(22) Filed: Jan. 18, 2024

(65) Prior Publication Data

US 2025/0238242 A1 Jul. 24, 2025

(51) Int. Cl.
*G06F 9/445* (2018.01)
*G06F 9/54* (2006.01)

(52) U.S. Cl.
CPC .......... *G06F 9/44505* (2013.01); *G06F 9/543* (2013.01)

(58) Field of Classification Search
CPC ............................ G06F 9/44505; G06F 9/543
See application file for complete search history.

(56) References Cited

U.S. PATENT DOCUMENTS

| | | | | |
|---|---|---|---|---|
| 8,078,971 B2 * | 12/2011 | Ghattu | ................ | G06F 9/44505 |
| | | | | 709/224 |
| 8,660,849 B2 | 2/2014 | Gruber et al. | | |
| 9,123,336 B1 | 9/2015 | Uszkoreit et al. | | |
| 10,761,824 B2 | 9/2020 | Asare et al. | | |
| 11,120,299 B2 | 9/2021 | Haigh et al. | | |
| 11,860,725 B2 * | 1/2024 | O'Toole | .............. | G06F 11/0772 |
| 12,008,473 B2 * | 6/2024 | Lazaridou | .............. | G06N 3/088 |
| 2011/0196853 A1 | 8/2011 | Bigham et al. | | |
| 2015/0355609 A1 | 12/2015 | Warren | | |

(Continued)

FOREIGN PATENT DOCUMENTS

| | | |
|---|---|---|
| CA | 2964349 C | 3/2023 |
| KR | 102537767 B1 | 5/2023 |

OTHER PUBLICATIONS

"A Smart Interactive Command Prompt Method" Authors Disclosed Anonymously. Nov. 3, 2019. 3 pages.

(Continued)

*Primary Examiner* — Tammara R Peyton

(74) *Attorney, Agent, or Firm* — Lily Neff, Esq.; Rachel L. Pearlman, Esq.; Heslin Rothenberg Farley & Mesiti, P.C.

(57) ABSTRACT

Computer implemented methods, systems, and computer program products include program code executing on a processor(s) that monitors execution of a script to complete a task via a command line interface, and based on completing the task, generates, based on the script, a non-directional representation of the script and a directional representation of the script. The processor(s) clusters the non-directional representation of the script with non-directional representations of similar scripts (successfully in advance of the monitoring). The processor(s) merges the directional representation of the script to a cluster comprising the non-directional representation of the script.

20 Claims, 9 Drawing Sheets

(56) References Cited

U.S. PATENT DOCUMENTS

| | | |
|---|---|---|
| 2022/0091923 A1 | 3/2022 | O'Toole et al. |
| 2022/0309243 A1 | 9/2022 | Sivashanmugam et al. |
| 2023/0073052 A1 | 3/2023 | Mohylevskyy et al. |

OTHER PUBLICATIONS

"A System and Method to Automated General Help Guide for Command Line Error" Authors disclosed Anonymously. Oct. 8, 2012. 9 pages.
"Automatic Command History Recording and Filtering for System/ Application Failure Prevention" Authors Disclosed Anonymously. Sep. 22, 2010. 5 pages.
"Smart Command Line Contextualization Mechanism" Authors Disclosed Anonymously. Jan. 22, 2020. 5 pages.

* cited by examiner

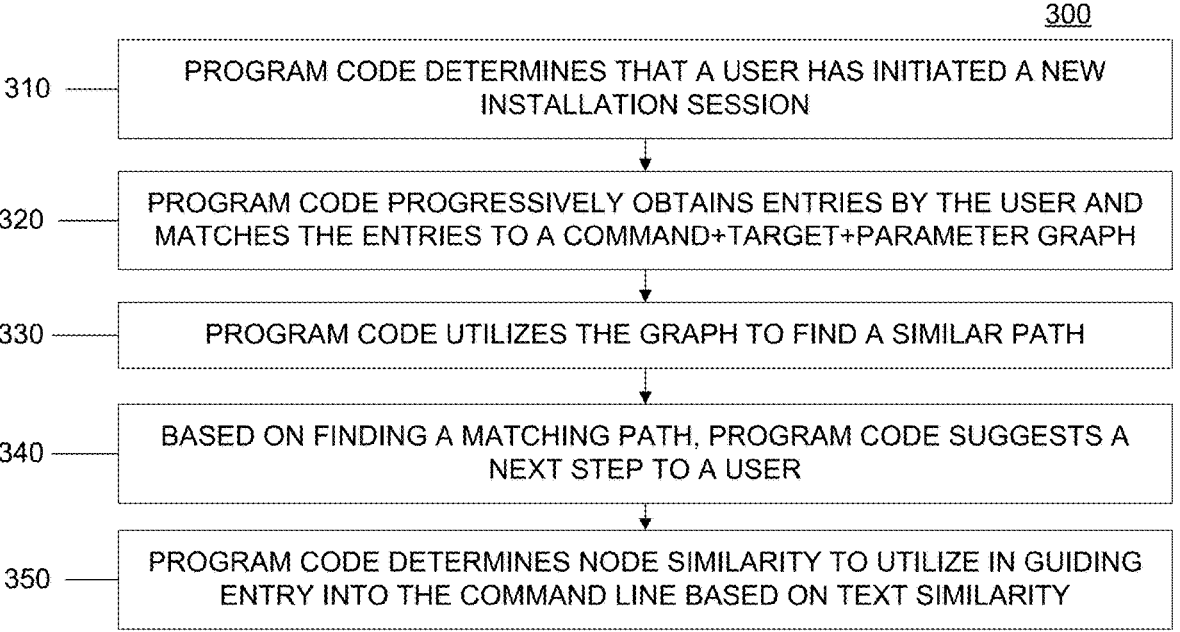

300

310 — PROGRAM CODE DETERMINES THAT A USER HAS INITIATED A NEW INSTALLATION SESSION

320 — PROGRAM CODE PROGRESSIVELY OBTAINS ENTRIES BY THE USER AND MATCHES THE ENTRIES TO A COMMAND+TARGET+PARAMETER GRAPH

330 — PROGRAM CODE UTILIZES THE GRAPH TO FIND A SIMILAR PATH

340 — BASED ON FINDING A MATCHING PATH, PROGRAM CODE SUGGESTS A NEXT STEP TO A USER

350 — PROGRAM CODE DETERMINES NODE SIMILARITY TO UTILIZE IN GUIDING ENTRY INTO THE COMMAND LINE BASED ON TEXT SIMILARITY

COMMAND LINE SCRIPT AUTOMATION BY MONITORING EXECUTION OF COMPLETED TASKS

BACKGROUND

The present invention relates generally to the field of system and application configuration and in particular, a method for efficiently and reliably providing a correct command line for configuration.

The command line is a text interface that takes in commands, which it passes on to the computer's operating system to run. From the command line, for example, a user can navigate through files and folders on a computer. The command line can sometimes be referred to as a command line interface (CLI), a command-line user interface, a console user interfaces and/or a character user interface. In addition to navigation, the CLI, a text-based user interface (UI), can be utilized to run programs, manage computer files and interact with the computer. Command-line interfaces are also called command-line user interfaces, console user interfaces and character user interfaces. A user, including an administrator, can utilize the CLI to enter commands to manage the system. For example, one can utilize command line configuration to quickly update configuration values rather than make these changes through a configuration tool user interface.

When utilizing the CLI to make system and/or application configuration changes, a user or administrator may need to run dozens of command lines both to implement the desired changes and to have the result of the commands be a functioning system and/or application. Because the commands are entered in a short text string, a small typographical error can lead to an undesired result. Additionally, depending on the familiarity of the user with the product (application and/or system) the user is configuring, the user could take time to detect a command line error and hence, may have to repeat part or all of the process in order to address the issue.

Artificial intelligence (AI) refers to intelligence exhibited by machines. Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided through the provision of a computer-implemented method for assisting command line script entry. The method can include: monitoring, by one or more processors, execution of a script to complete a task via a command line interface; based on the task being complete, generating, by the one or more processors, based on the script, a non-directional representation of the script and a directional representation of the script, wherein the directional representation of the script comprises complete execution paths; clustering, by the one or more processors, the non-directional representation of the script with non-directional representations of similar scripts, wherein the similar scripts were executed successfully in advance of the monitoring; and merging, by the one or more processors, the directional representation of the script to a cluster comprising the non-directional representation of the script.

Shortcomings of the prior art are overcome, and additional advantages are provided through the provision of a computer program product for assisting command line script entry. The computer program product comprises a storage medium readable by a one or more processors and storing instructions for execution by the one or more processors for performing a method. The method includes, for instance: monitoring, by the one or more processors, execution of a script to complete a task via a command line interface; based on the task being complete, generating, by the one or more processors, based on the script, a non-directional representation of the script and a directional representation of the script, wherein the directional representation of the script comprises complete execution paths; clustering, by the one or more processors, the non-directional representation of the script with non-directional representations of similar scripts, wherein the similar scripts were executed successfully in advance of the monitoring; and merging, by the one or more processors, the directional representation of the script to a cluster comprising the non-directional representation of the script.

Shortcomings of the prior art are overcome, and additional advantages are provided through the provision of a system for assisting command line script entry. The system includes: a memory, one or more processors in communication with the memory, and program instructions executable by the one or more processors via the memory to perform a method. The method includes, for instance: monitoring, by the one or more processors, execution of a script to complete a task via a command line interface; based on the task being complete, generating, by the one or more processors, based on the script, a non-directional representation of the script and a directional representation of the script, wherein the directional representation of the script comprises complete execution paths; clustering, by the one or more processors, the non-directional representation of the script with non-directional representations of similar scripts, wherein the similar scripts were executed successfully in advance of the monitoring; and merging, by the one or more processors, the directional representation of the script to a cluster comprising the non-directional representation of the script.

Computer systems and computer program products relating to one or more aspects are also described and may be claimed herein. Further, services relating to one or more aspects are also described and may be claimed herein.

Additional aspects of the present disclosure are directed to systems and computer program products configured to perform the methods described above. Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 is a workflow that provides an overview of various aspects performed by the program code (executing on one or more processors) in some embodiments of the present disclosure;

DETAILED DESCRIPTION

Figure 1:
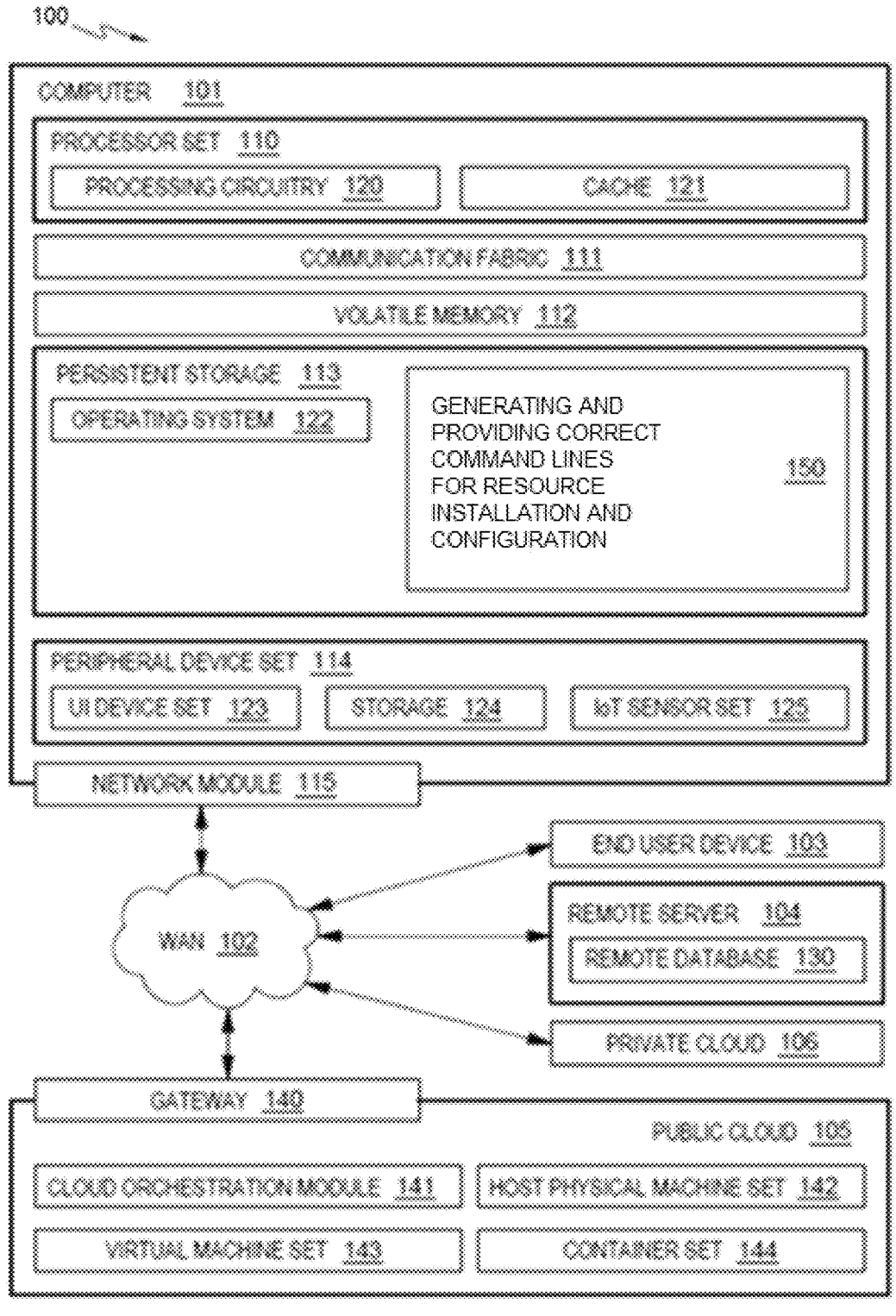
FIG. 1 depicts one example of a computing environment to perform, include and/or use one or more aspects of the present disclosure.

The examples herein provide suggested correct command lines based on crowdsourcing and the output of an AI module. As such, the examples herein assist command line script entry, including in real-time and in near real-time. Disclosed herein are computer-implemented methods, computer program products, and computing systems, where program code executing on one or more processors intelligently determines a predictable command line and provide it to a command line interface. When a session is successful, the program code stops monitoring entry and sanitizes the entries (e.g., scripts) made during the monitored the session. Given that the session includes a task (e.g., a goals including installation and/or configuration of software and/or hardware in computing system), the success or failure of the session is transparent both to users as well as to automated processes executing in the computing environment. Thus, in some examples, a user can confirm that a session was successful while in others, this process can be automated and is a determination made by program code executing on one or more processors. The program code can share the sanitized scripts by uploading it to a server (e.g., SXP server) and the program code constructs graphs for the scripts. The program code can utilize a graph (e.g., a command with a target graph) to cluster similar scripts, including but not limited to, by applying a clustering algorithm. The program code can merge commands with targets and parameters in the same cluster (of the clusters generated by the program code). Thus, when a user initiates a new install session (on the monitoring software), the program code can guide the (configuration) scripts executed based on its analysis of past sessions.

As will be discussed in greater detail herein, when aspects of the present invention are installed in a computing system, a user, who is configuring and/or installing software from a command line, can automatically receive assistance in the form of suggested correct command lines based on crowdsourcing and/or the output of an AI module. These correct command lines can be understood as "predictable" command lines, meaning that program code executing one or more processors can anticipate the progression of the command line and guide a user to a successful installation and/or configuration. In one example, the user can join an online script exchange portal (SXP) and publish a successful attempt (sanitized script) in installing a software system. If this user is installing a different software system, including one with which this user has no prior experience, the program code, via the online SXP (or another GUI or application programming interface (API) utilized by the user) can provide guidance during each installation step based on AI models the program code previously trained from other similar scripts captured in the SXP. In these examples, the program code utilizes both context information and AI to match the context to a similar context and identify a similar install script, enabling the program code to provide guidance, including but not limited to, suggesting installation steps. As discussed in greater detail herein, the program code exchanges scripts as opposed to rules, when guiding installations and configurations via the command line. In some examples, rather than provide a complete script to re-use, the program code interactively guides the user through an installation and/or configuration, via a command line interface.

Computer-implemented methods, computer program products, and computer systems described herein are inextricably linked to computing and are directed to a practical purpose. As aforementioned, the disclosed examples address a known issue in computing, errors in configuration commands provided in a command line and the difficulty in troubleshooting and addressing these errors. The examples herein are directed to the practical application of providing commands for a command line interface that do not introduce errors in configuration and enable users (including administrators) to utilize commands entered in a command line interface to efficiently and accurately configure various resources, including but not limited to, software, hardware, and other systems, resident within a technical computing environment, including shared and enterprise computing environment such as cloud computing environments. In addition to being inextricably tied to computing because the aspects described herein address an issue unique to computing, these aspects are also inextricably tied to computing because the approaches that comprise the aspects are themselves inextricably tied to computing. As will be discussed in greater detail herein, various examples include utilizing machine learning (e.g., deep learning), to merge execution paths of scripts and to recommend and enter command lines.

The examples herein provide significantly more than existing approaches to providing accurate command line guidance and commands particularly when a command line interface is utilized to install and/or configure a new system element. The computer-implemented methods, computer program products, and computer system described herein can leverage both crowdsourcing and artificial intelligence (e.g., machine learning) to provide command lines for use in configuring technical resources in a computing environments. Certain of the examples herein utilize a SXP to exchange scripts and to provide guidance during each installation step of a configuration/installation routine (performed via a command line interface). The use of the SXP is referred to herein as crowdsourcing because SXP users can publish successful scripts (installation and configuration scripts) that the program code can utilize to guide other users through later installation and configuration attempts. The program code constructs graphs, which in some examples are two graphs, a command+target (c+t) graph, and a command+target+parameters (c+t+p) graph for the scripts captured via the SXP. The program code can utilize a graph (e.g., the command+target graph) to cluster similar scripts, and can generate a merged graph (e.g., the command+target+parameter graph) for the cluster by merging all graphs in the cluster. The program code can then utilize this merged graph to suggest steps (e.g., commands to enter to configure a system element) and/or to automatically enter these steps (e.g., commands) by node matching and/or text matching. As such, the approach discussed herein provides significantly more at least because although automation rules are sometimes derived via crowdsourcing, the examples herein utilizes crowdsourcing to improve installation steps from a command console. Additional advantages of the examples herein include: 1) automatically providing (predicted) correct commands (for installation and configuration of resources in a computing environment; 2) providing users beyond an initial user with successful scripts to utilize in installing and configuring resources; 3) reducing troubleshooting time when configuring and installing resources from a command line; and 4) centralizing resolution of potential and existing command line issues.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as a code block for generating and providing correct command lines for resource installation and configuration 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, EUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer

101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
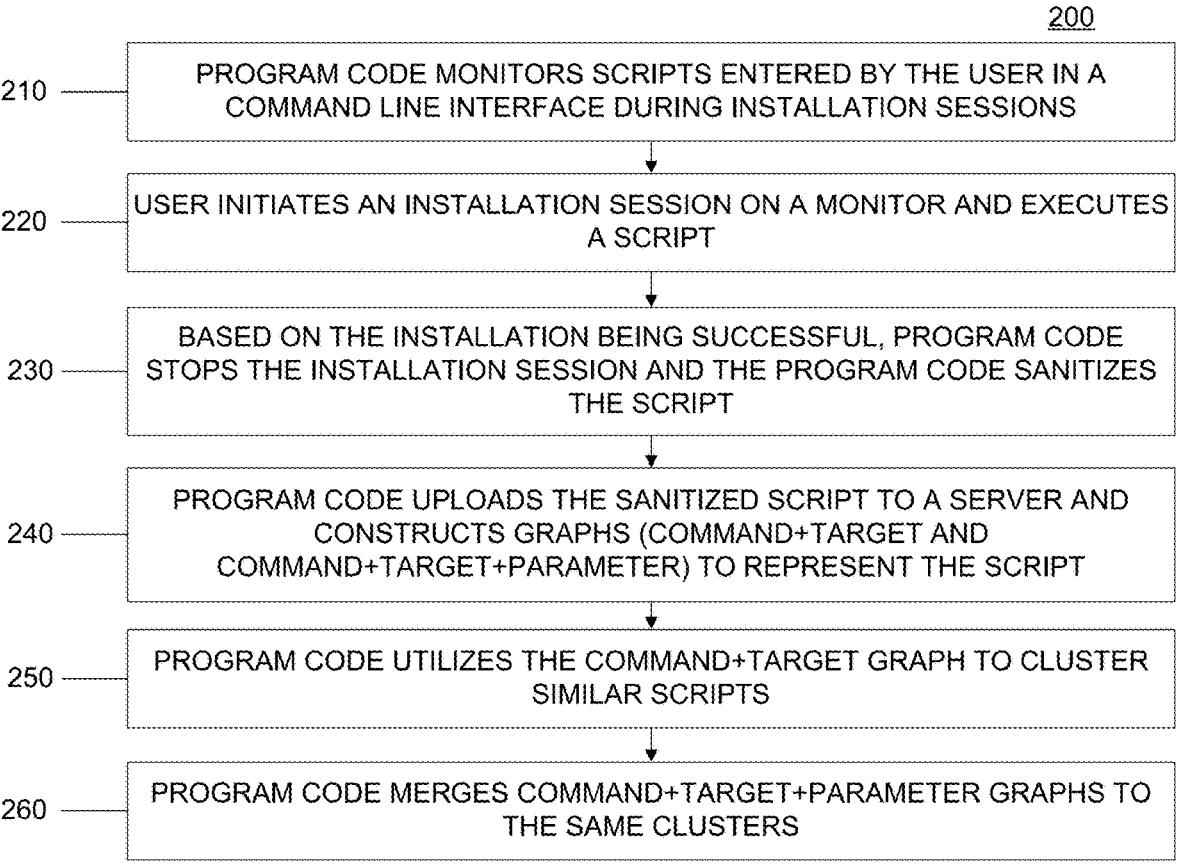
FIG. 2 is a workflow that provides an overview of various aspects performed by the program code (executing on one or more processors) in some embodiments of the present disclosure.

FIG. 2 is a workflow 200 that provide an overview of various aspects of some examples herein. As aforementioned, in the examples herein, program code executing on one or more processors provides correct command lines based on crowdsourcing and/or input from an AI module. As depicted in FIG. 2, in some examples, a user installs a SXP monitor so that program code comprising the SXP monitor can monitor scripts entered by the user in a command line interface during installation sessions (210). An SXP monitor is a non-limiting example of a script monitoring and publication tool that can be utilized with the aspects disclosed herein. The monitoring includes watching and recording the command lines entered by the user (executed by the system upon entry by the user). The user initiates an installation session on the SXP monitor and executes a script (220). Based on the installation being successful, the program code stops the installation session (which the program code was monitoring), and the program code (e.g., of the SXP monitor) sanitizes the script (230). In some examples, the program code can sanitize the script by performing one or more of the following: 1) replacing unique names with generic names (e.g., changing a specific entity name to a first initial, changing a proper name to an initial) utilizing a rule-based sanitizing system; and/or 3) making specific determinations about the script, including but not limited to, determining if a target is unique, if a target is great than 4 characters, if a target name is in a dictionary, and determining if words in the script are used less frequently (based on pre-determined thresholds). The program code uploads the sanitized script to a server (e.g., SXP server) and constructs graphs (e.g., two graphs) to represent the script (240). In some examples, the graphs are a command+target graph (e.g., non-directional with links between nodes showing how frequently the command and the target (in the command+target) are executed together), and a command+target+parameters graph (e.g., directional, and each path is a complete execution path). The program code utilizes a command target graph to cluster similar scripts (e.g., by applying a clustering algorithm) (250). The program code can determine whether a given script is similar to previously executed scripts by determining a distance of two paths (for different scripts). The program code can also determine if the length of two paths are identical by performing a node by node analysis to calculate text distances. The program code can also determine if lengths of two path are different based on the aforementioned node analysis. Once the program code has clustered similar scripts, the program code can merge a command and parameter (command+target+parameter) of the same cluster (260). A user can utilize the SXP monitor to publish a successful script. As the program code can utilize this script in the processes of FIG. 2-3, the publication of this script can be considered crowdsourcing. Thus, workflows 200 300 benefit from crowdsourcing.

Because the program code has sanitized a script and identified similar scripts, when a user initiates a new install session, the program code can utilize prior analyses to guide the user's new installation session. For example, referring to the workflow 300 of FIG. 3, the program code determines that a user has initiated a new installation session (310). The program code progressively obtains entries by the user and matched the entries to a command+target+parameter graph (320). The program code utilizes the graph to find a similar path (330). In one (non-limiting) example, if there are (approximately) three matching nodes, the program code determines that the paths match. Based on finding a matching path, the program code suggests a next step to a user (e.g., via an interface, including the command line interface)

(340). The program code can determine node similarity to utilize in guiding entry into the command line based on text similarity (350). The program code can utilize a text recognition algorithm to determine textual similarities.

When determining similarities between scripts, including performing matching in a command+target+parameter graph as well as determining whether there is a similar path, program code can utilize a neural network. Neural networks refer to a biologically inspired programming paradigm which enables a computer to learn from data. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network of the technical environment. Modern neural networks are non-linear statistical data modeling tools. They are usually used to model complex relationships between inputs and outputs or to identify patterns in data (i.e., neural networks are non-linear statistical data modeling or decision-making tools). In general, program code utilizing neural networks can model complex relationships between inputs and outputs and identify patterns in data, including, similarities between installation and configuration scripts, including finding common nodes, targets, parameters, and/or paths. Because of the speed and efficiency of neural networks, especially when parsing multiple complex data sets, neural networks and deep learning provide solutions to many problems in pattern recognition, including in text similarity recognition, in addition to image recognition, speech recognition, and natural language processing. Neural networks can model complex relationships between inputs and outputs to identify patterns in data, including in images as well as in scripts that are represented as graphs, for classification.

Figure 4:
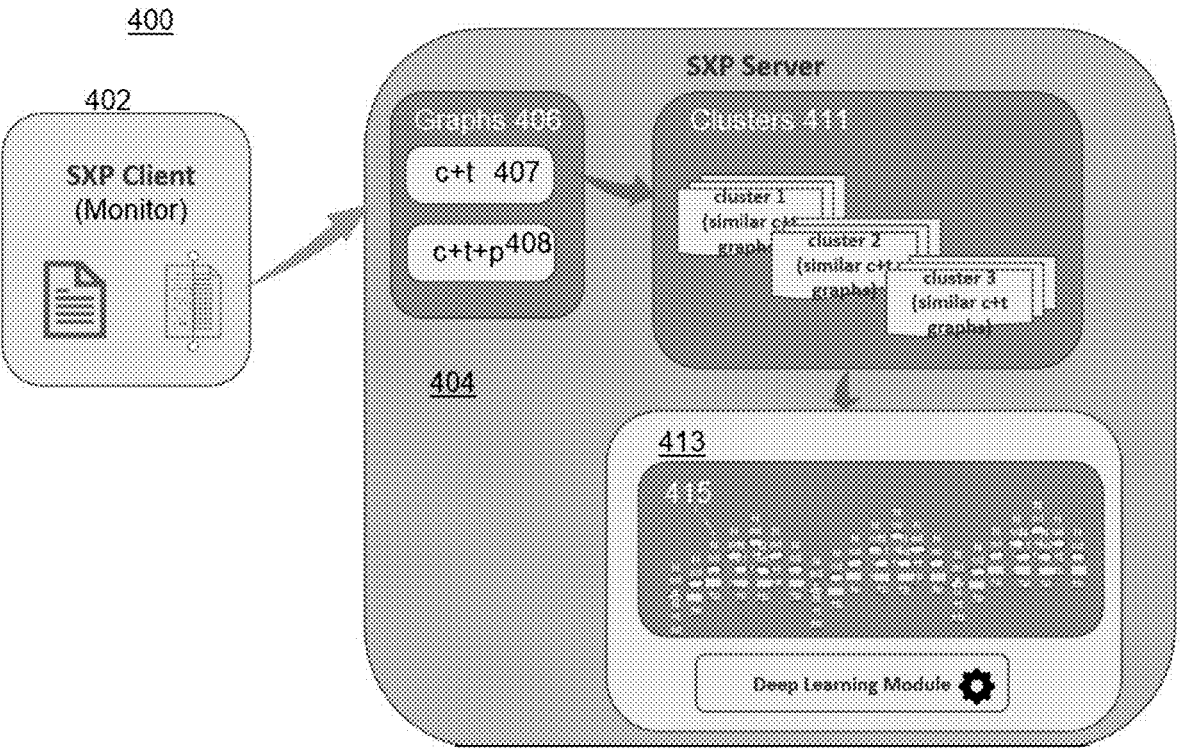
FIG. 4 is an illustration of aspects of a technical environment into which aspects performed by the program code (executing on one or more processors) in some embodiments of the present disclosure have been implemented.

FIG. 4 is an illustration of a technical environment 400 that performs various aspects of the workflow of FIG. 2. Thus, references are made to the workflow 200 of FIG. 4 as the technical environment 400 is described. The technical environment 400 includes a client 402 (e.g., a SXP monitor). Program code executed by one or more processors monitors activities on the client 402. As illustrated in FIG. 2, the user initiates an installation session on the SXP monitor and executes a script (utilizing the monitor 402) (220). Based on the installation and/or configuration being successful, the program code stops the installation session (which the program code was monitoring), and the program code (e.g., of the SXP monitor of the monitor 402) sanitizes the script (230). Additionally, as illustrated in FIG. 3, a user can utilize the monitor 402 to initiate a new installation session (310). A user can also utilize the monitor 402 to publish a script that the program code executed successfully (upon entry by the user).

Once the program code has monitored a successful script execution on the client 402, the program code can upload the sanitized script to a server 404 (e.g., SXP server). The program code constructs graphs 406 (e.g., two graphs, c+t 407 and c+t+p 408) to represent the script (e.g., FIG. 2, 240). The c+t graph 407 is non-directional with links between nodes showing how frequently the command and the target are executed together. The c+t+p graph 408 is directional, and each path is a complete execution path. The program code clusters the c+t graphs that are similar together. FIG. 4 depicts an example where there are three clusters 411, cluster 1, cluster 2, and cluster 3.

Figure 6:
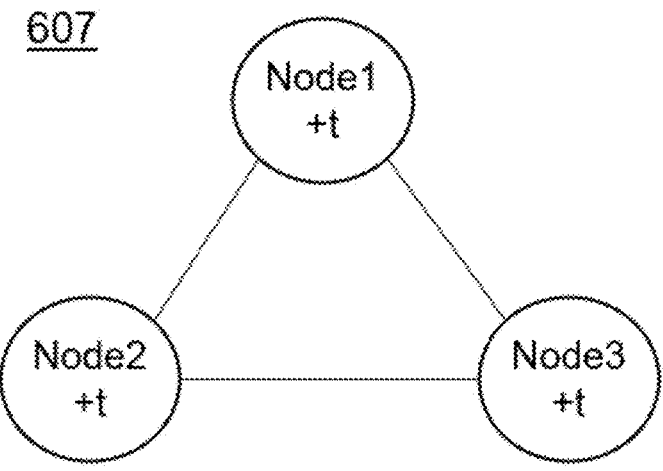
FIG. 6 is an example of a structure that can be generated by the program code (executing on one or more processors) in some embodiments of the present disclosure.
Figure 9:
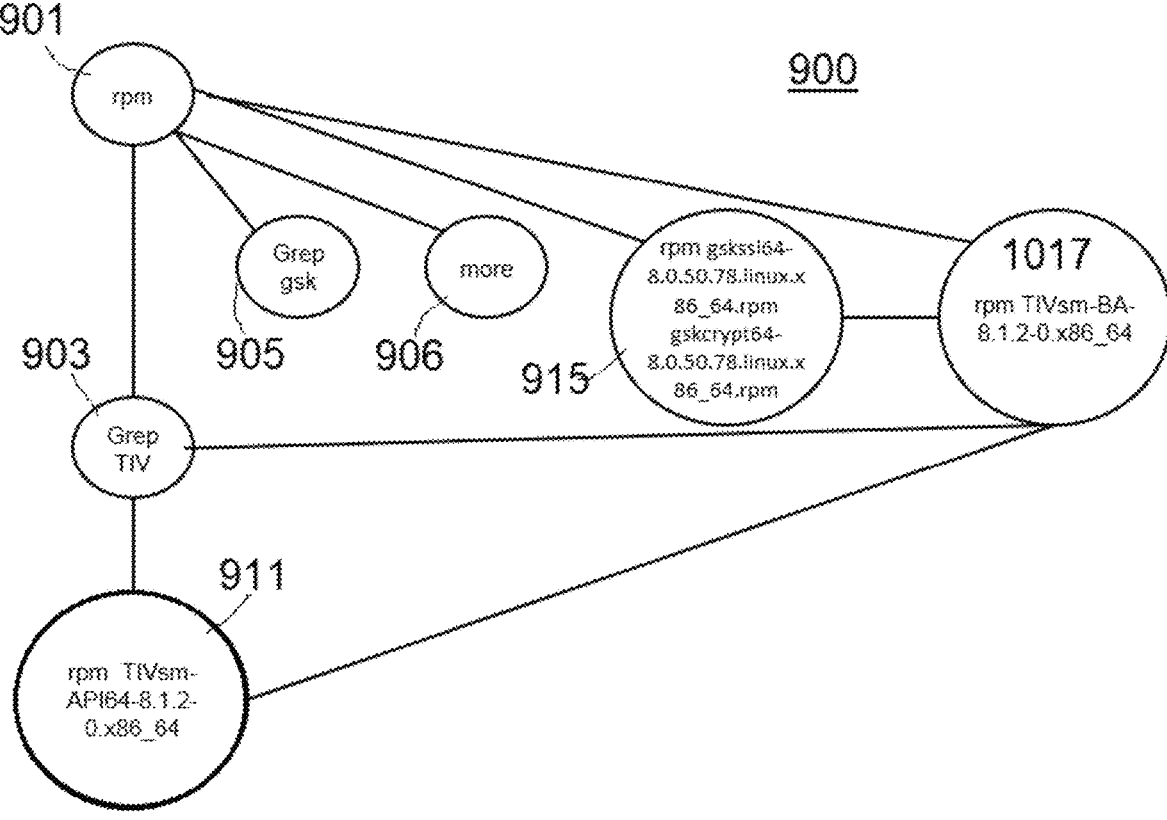
FIG. 9 is an example of a structure that can be generated by the program code (executing on one or more processors) in some embodiments of the present disclosure.
Figure 10:
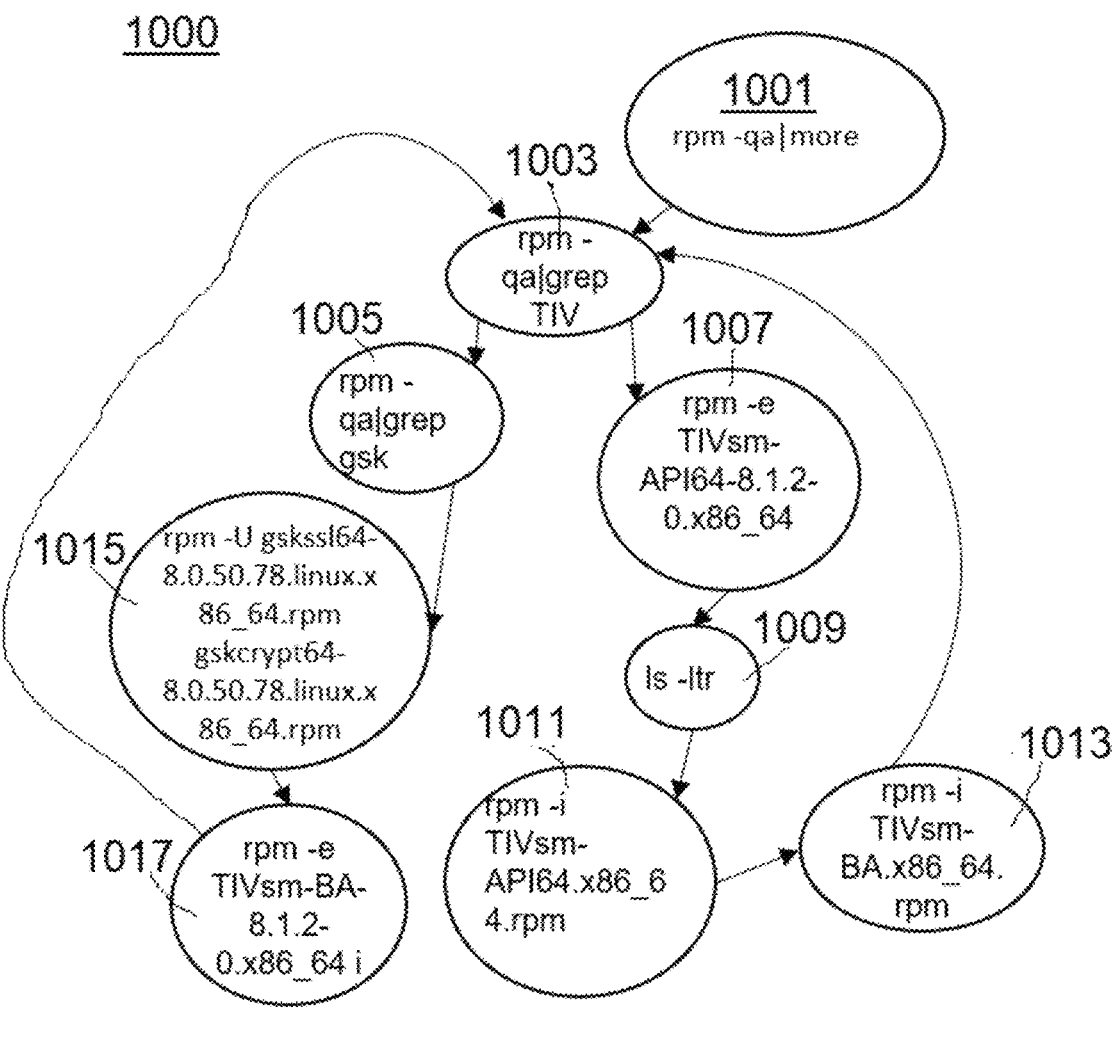
FIG. 10 is an example of a structure that can be generated by the program code (executing on one or more processors) in some embodiments of the present disclosure.

The c+t graph 407 is non-directional but the links between nodes in the graph represent how frequently they are executed together. FIG. 6 illustrates a c+t graph 607 comprised of three nodes: node1, node2, and node3. Each node would include the command as well as the target of the command. To construct the c+t graph 407 607, the program code converts the command line into command node with a target as node properties. Using the command "rpm -e TIVsm-BA-8.1.2-0.x86_64," as an example of what can be included in a node, "rpm -e" is the command and "TIVsm" is the target, the software package being installed by the "rpm -e" command. Both this command and the software are discussed in more detail relative to FIGS. 9 and 10. In some examples, the program code normalizes the target. To generate the c+t graph 407 607, the program code removes irrelevant nodes (ls (contents of the directory), pwd (absolute pathname of the current directory), etc.), merges command nodes, and adds execution links. An example of the differences between a c+t graph and a c+t+p graph for the same script are illustrated in FIGS. 9 and 10, which are discussed later herein.

Figure 7:
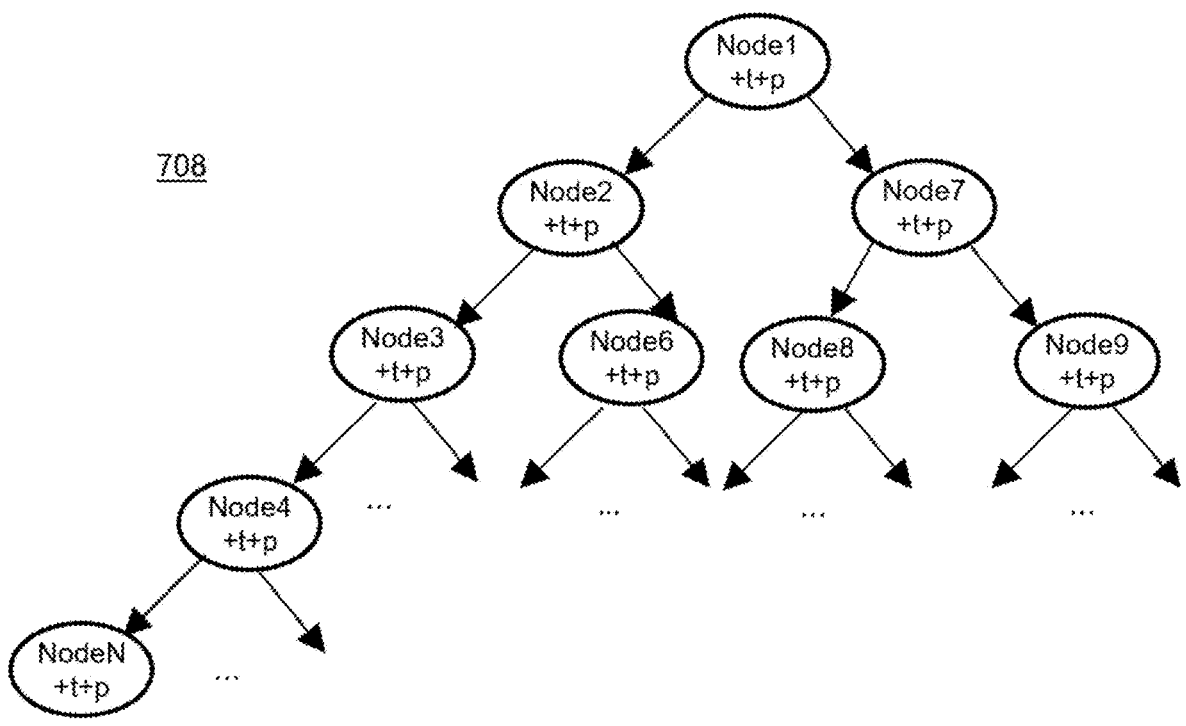
FIG. 7 is an example of a structure that can be generated by the program code (executing on one or more processors) in some embodiments of the present disclosure.

Returning to FIG. 4, the program code also constructs a c+t+p graph 408, which is directional, and each path is a complete execution path. FIG. 7 is an example of a c+t+p graph 708, which is a parameter decision tree. To generate the c+t+p graph 408 708, the program code converts a command line with parameters and a target into one or more parameter decision nodes (e.g., with ascending normalized names). As such, the program code removes (from the script) irrelevant nodes (e.g., ls, pwd, etc.). The program code merges decision nodes by execution sequences and levels the sequences into a decision tree with execution links. As illustrated in FIG. 7, the c+t+p graph 708 includes nodes from node through node N.

Upon clustering similar scripts, the program code can then determine whether a given script is similar to a previously executed script by determining text similarity for different scripts, in like clusters. Based on the distances being within an acceptable threshold, the program code merges execution paths for the same clusters. The program code performing the merge can be program code in a deep learning module 413. The program code of the deep learning module can merge a new c+t+p graph with the same c+t+p graph cluster. The program code can cluster the graphs utilizing a clustering algorithm that evaluates several sets of execution paths using a distance function. The program code using the clustering algorithm and the command with target graph to cluster similar scripts. As such, the program code determines the distance of two paths. If length of two paths are identical, the program code performs a node by node calculation of the text distance. If length of the two paths are different, the program performs a node by node calculation of the text distance after sampling nodes to a same length. In some examples, the program code can utilize a Hamming distance, with |xi−yi| as the value of command difference, which the program code can map (as values) between every two system commands. An example of this function is reproduced below:

$$d(x, y) = \frac{1}{n} \sum_{n=1}^{n=n} |x_i - y_i|$$

The deep learning module 413, in certain examples, can utilize supervised, semi-supervised, or unsupervised deep learning through a single- or multi-layer NN (neural network) to correlate and merge the clusters based on the graphs of the sanitized script (when compared to historically executed scripts). The program code utilizes resources of the NN to identify and weight connections between scripts/graphs. For example, the NN can identify certain data that are indicative of path similarities, in real-time, based on utilizing patterns that the program code identifies in the historical data. The deep learning module 413 performs deep learning, which is a set of techniques for learning in neural networks. Neural networks, including modular neural networks, are capable of pattern recognition with speed, accuracy, and efficiency, in a situation where data sets are multiple and expansive, including across a distributed network of the technical environment. Modern neural networks are non-linear statistical data modeling tools. They are usually used to model complex relationships between inputs and outputs or to identify patterns in data (i.e., neural networks are non-linear statistical data modeling or decision-making tools). In general, program code utilizing neural networks can model complex relationships between inputs and outputs and identify patterns in data. Because of the speed and efficiency of neural networks, especially when parsing multiple complex data sets, neural networks and deep learning both provide assistance in parsing both structures and unstructured data across multiple resources in a technical environment. Thus, by utilizing an NN the program code can identify and classify similarities in scripts represented as graphs.

In the example in FIG. 4, the program code can utilize machine and deep learning (e.g., the deep learning module 413, which can comprise a deep learning model) to generate multi variable models. The program code obtains multi-variant measurements (e.g., the graphs 406 representing the sanitized scripts as well as historical graphs) which the program code clusters into cluster models (e.g., clusters 411) utilizing machine learning or deep learning (the historical data can act as training data to train the models). The program code can utilize various existing techniques to cluster the graphs/scripts into a model. For example, the program code can perform k-means clustering as a method of vector quantization to partition n measurements into k clusters in which each observation belongs to the cluster with the nearest mean, serving as a prototype of the cluster. The program code can also utilize hierarchical clustering to build a hierarchy of clusters to generate the models. These examples, which can also include AE (autoencoding), are non-limiting and merely provided for illustrative purposes. In some examples, each cluster 411 can form a steady state. As illustrated in FIG. 4, each of the clusters 411 is comprised of similar c+t graphs, as determined by the program code.

In some examples, the program code guides future installations based on maintaining a knowledge base of clustered sanitized scripts (represented by graphs) that can be correlated with entries via a command line interface. The program code utilizes these historical data to guide installation and configuration efforts executed vis a command line, in real-time. Thus, a user can indicate to a monitor 402 that a job (e.g., installation, configuration, etc.), has been completed successfully, and the program code of the client can collect the steps taken to complete the job. In some examples, the client 402 can enable the user to protect any confidential information included in the commands entered by the user. Thus, the program code can replace confidential information with text strings (e.g., "XXXX").

Figure 5:
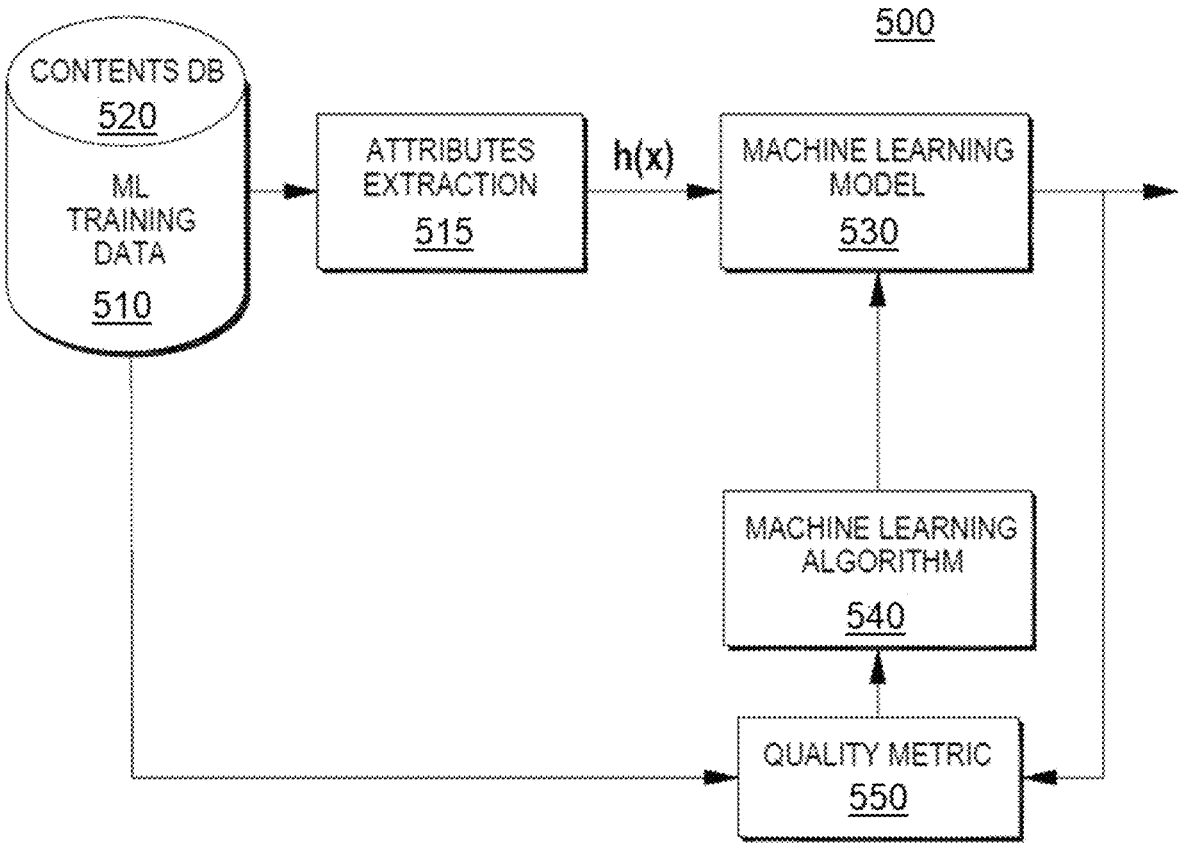
FIG. 5 is one example of a machine learning training system that can be utilized to perform various aspects performed by the program code (executing on one or more processors) in some embodiments of the present disclosure.

FIG. 5 is one example of a machine learning training system 500 that can be utilized, in one or more aspects, to perform cognitive analyses of various inputs, including historical data as well as the new graphs 406 and the scripts from which the program code generates the graphs. The program code in embodiments of the present invention performs a cognitive analysis to generate the clusters 411 and to merge a new c+t+p graph with the same c+t+p graph cluster. Machine learning (ML) solves problems that are not solved with numerical means alone. In this ML-based example, program code extracts various attributes (515) from historical scripts (represented by graphs), which serve as ML training data 510. These attributes can be utilized to develop a predictor or classifier function, h(x), also referred to as a hypothesis, which the program code utilizes as a machine learning model 530. In identifying various resource types, features and/or parameters in the ML training data 510, which can be stored in one or more contents database 520, the program code can utilize various techniques to identify attributes in an embodiment of the present invention. Embodiments of the present invention utilize varying techniques to select attributes (elements, patterns, features, components, etc.), including but not limited to, diffusion mapping, principal component analysis, recursive feature elimination (a brute force approach to selecting attributes), and/or a Random Forest, to select the attributes related to various events. The program code can utilize a machine learning algorithm 540 to train the machine learning model 530 (e.g., the algorithms utilized by the program code), including providing weights for the conclusions, so that the program code can train the predictor functions that comprise the machine learning model 530. The conclusions can be evaluated by a quality metric 550. By selecting a diverse set of ML training data 510, the program code trains the machine learning model 530 to identify and weight various attributes (e.g., features, patterns, components) that correlate to different scripts and reveal similarities in scripts, enabling the program code to cluster and/or merge similar scripts.

The model generated by the program code can be self-learning as the program code updates the model (clusters maintained by the deep learning module 413) based on active event feedback, as well as from the feedback received from data related to the event. For example, when the program code determines that there is information that was not previously predicted or classified by the model, the program code utilizes a learning agent to update the model to reflect the script type, to improve classifications in the future. Additionally, when the program code determines that a classification is incorrect, either based on receiving user feedback through an interface or based on monitoring related to the event (e.g., the SXP monitor 402), the program code updates the model to reflect the inaccuracy of the classification, including for the given period of time. Program code comprising a learning agent cognitively analyzes the data deviating from the modeled expectations and can adjust the model to increase the accuracy of the model, moving forward.

Figure 8:
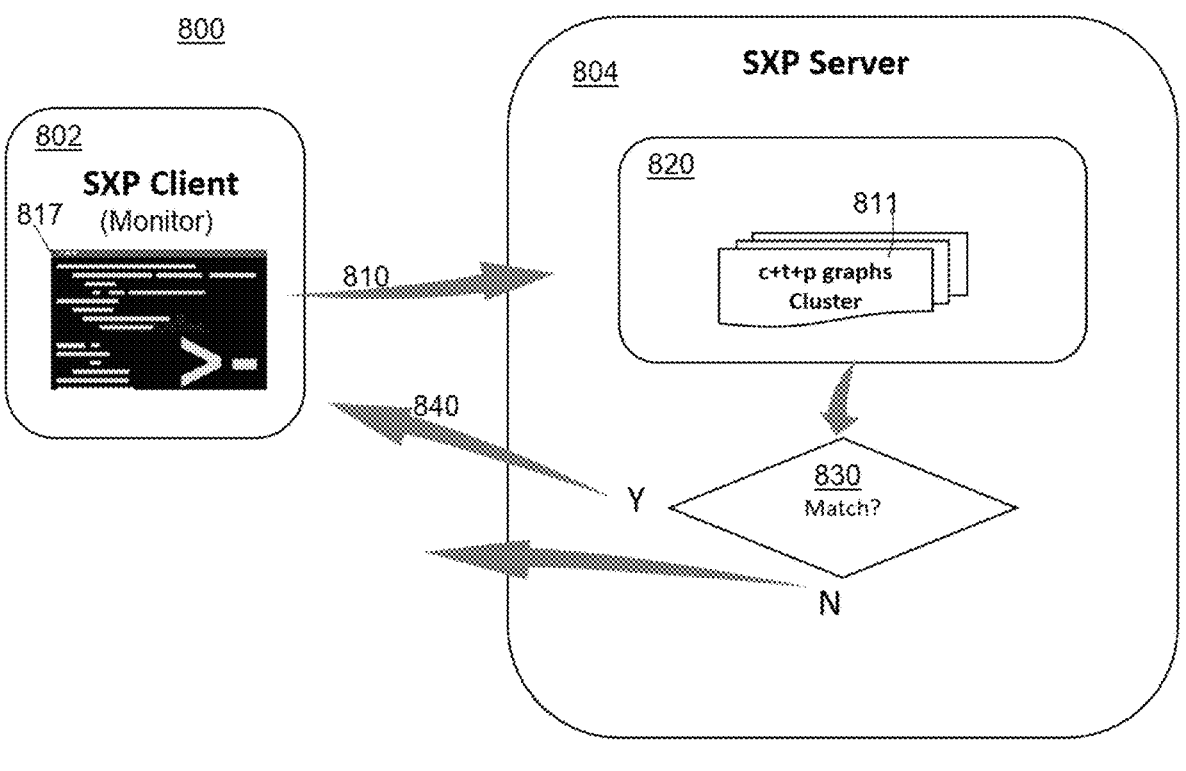
FIG. 8 is an illustration of aspects of a technical environment into which aspects performed by the program code (executing on one or more processors) in some embodiments of the present disclosure have been implemented.

As illustrated in FIG. 4, the program code of the deep learning module 413 generates merged execution graphs 415 that the program code utilizes to guide entry of command lines. FIG. 8 illustrates aspects of a technical environment 800 and includes aspects of the workflow 300 of FIG. 3. As illustrated in FIG. 8, a user started a new installation or configuration session in a client 802 (e.g., SXP monitor) (e.g., FIG. 3, 310). During the session, the monitor 802 sends the commands (e.g., command lines 817) entered by the user, in the monitor 802, to the server 804 (e.g., SXP server) (810). Program code executing on the server 804 tried to match a c+t+p graph in a cluster 811 to the command line 817 (e.g., script) (820). The program code determines if there is a path similarity between the command line 817 and the c+t+p graph in a cluster 811 (830). In some examples, if the program code determined that approximately three nodes in the matched c+t+p graph in a cluster 811 match the command line 817, the program code will suggest a next step via the monitor 802, based on the progression of the c+t+p graph in a cluster 811, which is based on a successful installation (840). As illustrated in FIG. 3, the program code can determine node similarity to utilize in guiding entry into the command line based on text similarity (350). If the program code cannot match the command line 817, the program code will retain the script upon successful completion of the installation and/or suggest, via the interface, to the user, that the user should publish the script, via the client 802, once the installation is successful (850). Then, this script can be added to the clusters and the model generated by the deep learning module (e.g., FIG. 4, 413). In some examples, to determine path similarities between an entry and clustered match c+t+p graphs, the program code attempts to match three nodes to match a path before determining there is a match and suggesting a next step.

FIG. 9 is an example of a c+t graph 900 that the program code can generate from the same script as the execution graph 1000 of FIG. 10. As with FIG. 10, the graph 900 of FIG. 9, commences with an rpm command 901. Additionally, there are commands that check whether GSK is installed 905 and whether TIV is installed 903. There are also commands to install, remove, upgrade, and/or verify packages for GSK (command 915) and TIVsm (commands 911 917). There is an rpm command with no designator regarding which activity (install, remove, upgrade, and/or verify) should be applied to the packages. Thus, there is a command (e.g., rpm) and a target (TIVsm or GSK), but to parameter (install, remove, upgrade, and/or verify). A "more" command 906 can be understood as a placeholder for additional commands in the script. The graph of FIG. 9 is non-directional and illustrates how frequently the command and the target (in the command+target) in each node are executed together.

FIG. 10 illustrates a merged execution graph 1000 (which is also a c+t+p graph) generated by the program code. The primary command used in this example is the rpm command. RPM is a utility to manage the software in all major Linux distributions. Linux is used here as a non-limiting example of an operating system that can utilize aspects of the examples described. RPM (e.g., the rpm commands) can be utilized to install packages, remove packages, upgrade packages, and verify packages. FIG. 10 also provides a non-limiting and illustrative example and is relevant to installing a monitoring package, IBM® Tivoli® (TIV) software, which can include Tivoli® Storage Manager (TIVsm). IBM® and Tivoli® are registered trademarks of International Business Machines Corporation, Armonk, New York, US. The TIV software utilizes Global Security Kit (GSK) and hence, installing TIV via a command line would involve interacting with an installation (updating, implementing, etc.) of GSK. The relationship between TIV and GSK in illustrated in the execution graph 1000.

When a user enters a command (e.g., in a command line interface), the program code utilizes the execution graph 1000 (which is a c+t+p graph (e.g., FIG. 4, 408) generated by the program code) to guide the user through the installation or configuration. As the user works through the installation or configuration, the program code can suggest next steps (which will likely be successful as it is guided by the program code utilizing an execution graph 1000 that is based on one or more prior script execution). Based on the progression through the graph 1000, the program code can suggest next steps via the client (e.g., FIG. 8, 802). In some examples, the program code can display the progression of the nodes on the matched execution graph. The commands included in the execution graph 1000 are provided for illustrative purposes only and to demonstrate possible script guidance provided by the system. The specificity of the example is not provided to suggest any limitations but merely to assist in understanding an application of the aspects described herein in guiding an installation via a command line.

In this example, the execution graph 1000 (a c+t+p graph) begins with a first command 1001 that request a list of the recently installed packages and then pipes the list to a file (so that the command sequence can be viewed). The script (as illustrated in the execution graph 1000) then verifies if a package, in this example, TIV, is installed with the second command 1003 (e.g., rpm -qa|grep TIV). The rpm -qa command requests a list of installed packages along with their names and versions. The "grep" command verifies whether a package has been installed. The execution graph 1000 splits depending on whether the package that the "grep" command (second command 1003) the program code attempted to verify was installed.

There are two paths after the second command 1013 (which includes grep TIV). The execution graph 1000 can remove (e.g., rpm -e) the (e.g., TIV) package that it checked for, with subsequent command, including: a command 1007 to remove the package, another command 10010 to create a list of filed in the directory, and some additional installation commands 1011 1013 (e.g., rpm -i, which install the storage manager). Alternatively (along the other path), the execution graph 1000 can suggest to a user, based on the progression of the graph, to upgrade a package (e.g., Global Security Kit (GSK)) with an upgrade command 1015 (e.g., rpm -u . . . ) and then, to remove the package as a command 1017 (e.g., TIV storage manager) that was checked for when the paths split. As each path terminates either in the installation of the package (command 1013 (e.g., rpm -i . . . )), or the removal of the package (command 1017 (e.g., rpm -e . . . )), the next node that can guide the user is second command 1003, which checks whether the package was installed and prints a list of packages installed, including their versions.

The examples herein include computer systems, computer program products, are computer-implemented methods where program code executing on one or more processors assists command line script entry. In some examples, the program code monitors execution of a script to complete a task via a command line interface. Based on the task being complete, the program code generates, based on the script, a non-directional representation of the script and a directional representation of the script, where the directional representation of the script comprises complete execution paths. The program code clusters the non-directional representation of the script with non-directional representations of similar scripts; the similar scripts were executed successfully in advance of the monitoring. The program code merges the directional representation of the script to a cluster comprising the non-directional representation of the script.

In some examples, the non-directional representation of the script comprises a first graph where each node in the first graph comprises a command and a target in the script.

In some examples, the first graph represents how frequently the command and the target are executed together.

In some examples, the directional representation of the script comprises a second graph wherein each node in the second graph comprises a command, a target, and a parameter in the script.

In some examples, the program code determines commencement of entry of a new script via to accomplish a new task via the command line interface. The program code progressively obtains text comprising portions of the new script, via the command line interface. Based on the program code obtaining the text, the program code compares a portion of the new script to the directional representation of the script based on identifying at least one similar path between the new script and the directional representation of the script.

In some examples, based on the comparing, the program code identifies the at least one similar path. The program code utilizes the at least one similar path, to suggest, via a user interface, a next text input to enter via the command line interface.

In some examples, the program code utilizes each node in the at least one similar path to continue suggesting sequential text inputs via the user interface. The program code determines that the new task is complete.

In some examples, the program code publishes text entries in the command line interface from the commencement of the entry to the determining the task is complete as a second script. The program code generates, based on the second script, a non-directional representation of the second script and a directional representation of the second script. The program code clusters, utilizing the machine learning algorithm, the non-directional representation of the second script with non-directional representations of scripts similar to the second script. The scripts similar to the second script were executed successfully in advance of the publishing. The program code merges the directional representation of the second script to a cluster comprising the non-directional representation of the script.

In some examples, the task and the new task are selected from the group consisting of: installing a given software package and configuring a given software package.

In some examples, based on the program code comparing does not identify the at least one similar path. In these examples, the program code can monitor execution of the new script. The program code determines that the new task has been completed successfully. The program code generates, based on the new script, a non-directional representation of the new script and a directional representation of the new script. The program code generates a new cluster based on the non-directional representation of the new script and the directional representation of the new script.

In some examples, a script exchange portal client performs the monitoring.

In some examples, the at least one similar path comprises at least three common nodes between the portion of the new script and the directional representation of the script.

In some examples, prior to generating the non-directional representation of the script and the directional representation of the script, the program code sanitizes the script.

In some examples, the program code publishing the second script comprises the program code publishing the second script to a script exchange portal server.

In some examples, the program code clustering the non-directional representation of the script with the non-directional representations of similar scripts comprises: the program code determining the script is similar to the non-directional representations of the similar scripts by calculating a distance between each node of the script in the non-directional representations and each node in one or more non-directional representations of other scripts, and identifying the non-directional representations of the similar scripts from the one or more non-directional representations of other scripts based on the distance being within a predetermined threshold.

In some examples, the distance comprises a text distance.

In some examples, the clustering comprises the program code applying a machine learning algorithm. The program code can also train the machine learning algorithm utilizing the similar scripts as training data.

In some examples, the program code determines that the task has been completed successfully.

Although various embodiments are described above, these are only examples. For example, reference architectures of many disciplines may be considered, as well as other knowledge-based types of code repositories, etc., may be considered. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of assisting command line script entry, the method comprising:

monitoring, by one or more processors, execution of a script to complete a task via a command line interface;

based on the task being complete, generating, by the one or more processors, based on the script, a non-directional representation of the script and a directional representation of the script, wherein the directional representation of the script comprises complete execution paths;

clustering, by the one or more processors, the non-directional representation of the script with non-directional representations of similar scripts, wherein the similar scripts were executed successfully in advance of the monitoring; and merging, by the one or more processors, the directional representation of the script to a cluster comprising the non-directional representation of the script.

2. The computer-implemented method of claim 1, wherein the non-directional representation of the script comprises a first graph wherein each node in the first graph comprises a command and a target in the script.

3. The computer-implemented method of claim 2, wherein first graph represents how frequently the command and the target are executed together.

4. The computer-implemented method of claim 1, wherein the directional representation of the script comprises a second graph wherein each node in the second graph comprises a command, a target, and a parameter in the script.

5. The computer-implemented method of claim 1, further comprising:

determining, by the one or more processors, commencement of entry of a new script to accomplish a new task via the command line interface;

progressively obtaining, by the one or more processors, text comprising portions of the new script, via the command line interface; and based on the obtaining, comparing, by the one or more processors, a portion of the new script to the directional representation of the script based on identifying at least one similar path between the new script and the directional representation of the script.

6. The computer-implemented method of claim 5, further comprising:

based on the comparing, identifying, by the one or more processors, the at least one similar path; and utilizing, by the one or more processors, the at least one similar path, to suggest, via a user interface, a next text input to enter via the command line interface.

7. The computer-implemented method of claim 6, further comprising:

utilizing, by the one or more processors, each node in the at least one similar path to continue suggesting sequential text inputs via the user interface; and determining, by the one or more processors, that the new task is complete.

8. The computer-implemented method of claim 7, further comprising:

publishing, by the one or more processors, text entries in the command line interface from the commencement of the entry to the determining the task is complete as a second script;

generating, by the one or more processors, based on the second script, a non-directional representation of the second script and a directional representation of the second script;

clustering, by the one or more processors, utilizing a machine learning algorithm, the non-directional representation of the second script with non-directional representations of scripts similar to the second script, wherein the scripts similar to the second script were executed successfully in advance of the publishing; and merging, by the one or more processors, the directional representation of the second script to a second cluster comprising the non-directional representation of the script.

9. The computer-implemented method of claim 5, wherein the task and the new task are selected from the group consisting of: installing a given software package and configuring the given software package.

10. The computer-implemented method of claim 5, further comprising:

based on the comparing, not identifying, by the one or more processors, the at least one similar path;

monitoring, by the one or more processors, execution of the new script;

determining, by the one or more processors, that the new task has been completed successfully;

generating, by the one or more processors, based on the new script, a non-directional representation of the new script and a directional representation of the new script; and generating, by the one or more processors, a new cluster based on the non-directional representation of the new script and the directional representation of the new script.

11. The computer-implemented method of claim 1, wherein a script exchange portal client performs the monitoring.

12. The computer-implemented method of claim 5, wherein the at least one similar path comprises at least three common nodes between the portion of the new script and the directional representation of the script.

13. The computer-implemented method of claim 1, further comprising:

prior to generating the non-directional representation of the script and the directional representation of the script, sanitizing, by the one or more processors, the script.

14. The computer-implemented method of claim 8, wherein publishing the second script comprises publishing the second script to a script exchange portal server.

15. The computer-implemented method of claim 1, wherein clustering the non-directional representation of the script with the non-directional representations of the similar scripts comprises:

determining, by the one or more processors, the script is similar to the non-directional representations of the similar scripts, wherein the determining comprises:

calculating, by the one or more processors, a distance between each node of the script in the non-directional representations and each node in one or more non-directional representations of other scripts; and identifying, by the one or more processors, the non-directional representations of the similar scripts from the one or more non-directional representations of the other scripts based on the distance being within a pre-determined threshold.

16. The computer-implemented method of claim 15, wherein the distance comprises a text distance.

17. The computer-implemented method of claim 4, wherein the clustering comprises applying a machine learning algorithm, the method further comprising:

training, by the one or more processors, the machine learning algorithm utilizing the similar scripts as training data.

18. The computer-implemented method of claim 1, further comprising:

determining, by the one or more processors, that the task has been completed successfully.

19. A computer system for assisting command line script entry, the computer system comprising:

a memory; and one or more processors in communication with the memory, wherein the computer system is configured to perform a method, said method comprising:

monitoring, by the one or more processors, execution of a script to complete a task via a command line interface;

based on the task being complete, generating, by the one or more processors, based on the script, a non-directional representation of the script and a directional representation of the script, wherein the directional representation of the script comprises complete execution paths;

clustering, by the one or more processors, utilizing a machine learning algorithm, the non-directional representation of the script with non-directional representations of similar scripts, wherein the similar scripts were executed successfully in advance of the monitoring; and merging, by the one or more processors, the directional representation of the script to a cluster comprising the non-directional representation of the script.

20. A computer program product for assisting command line script entry, the computer program product comprising:

one or more computer readable storage media and program instructions collectively stored on the one or more computer readable storage media readable by at least one processing circuit to:

monitor execution of a script to complete a task via a command line interface;

based on the task being complete, determine that the task has been completed successfully;

generate, based on the script, a non-directional representation of the script and a directional representation of the script, wherein the directional representation of the script comprises complete execution paths;

cluster, utilizing a machine learning algorithm, the non-directional representation of the script with non-directional representations of similar scripts, wherein the similar scripts were executed successfully in advance of the monitoring; and merge the directional representation of the script to a cluster comprising the non-directional representation of the script.

* * * * *